June 2, 1953 F. C. GENCO ET AL 2,640,305
MACHINE FOR GLUING AND SEALING CARTON FLAPS
Filed Aug. 1, 1949 8 Sheets-Sheet 1

INVENTOR.
Frank C. Genco
Ernest R. Edmunds
BY Nicholas Panzarella
Albert R. Henry
Atty.

June 2, 1953 F. C. GENCO ET AL 2,640,305
MACHINE FOR GLUING AND SEALING CARTON FLAPS
Filed Aug. 1, 1949 8 Sheets-Sheet 2

INVENTOR.
Frank C. Genco
Ernest R. Edmunds
Nicholas Panzarella
BY
Albert R. Henry
Atty June 2, 1953  F. C. GENCO ET AL  2,640,305
MACHINE FOR GLUING AND SEALING CARTON FLAPS
Filed Aug. 1, 1949  8 Sheets-Sheet 3

INVENTOR.
Frank C. Genco
BY Ernest R. Edmunds
Nicholas Panzarella
Albert R. Hewitt
Atty June 2, 1953 — F. C. GENCO ET AL — 2,640,305
MACHINE FOR GLUING AND SEALING CARTON FLAPS
Filed Aug. 1, 1949 — 8 Sheets-Sheet 4

INVENTOR.
Frank C. Genco
Ernest R. Edmunds
Nicholas Panzarella
BY

June 2, 1953  F. C. GENCO ET AL  2,640,305
MACHINE FOR GLUING AND SEALING CARTON FLAPS
Filed Aug. 1, 1949  8 Sheets-Sheet 5

INVENTOR.
Frank C. Genco
Ernest R. Edmunds
BY Nicholas Panzarella
Albert R. Henry
Atty June 2, 1953  F. C. GENCO ET AL  2,640,305
MACHINE FOR GLUING AND SEALING CARTON FLAPS
Filed Aug. 1, 1949  8 Sheets-Sheet 7

INVENTOR.
Frank C. Genco
BY Ernest R. Edmunds
Nicholas Panzarella

Patented June 2, 1953

2,640,305

UNITED STATES PATENT OFFICE 2,640,305

MACHINE FOR GLUING AND SEALING CARTON FLAPS

Frank C. Genco, Buffalo, Ernest R. Edmunds, Tonawanda Township, Erie County, and Nicholas Panzarella, Buffalo, N. Y.; said Edmunds and said Panzarella assignors to said Genco Application August 1, 1949, Serial No. 108,034

1 Claim. (Cl. 53—145)

This invention relates to packaging machines, and it has particular reference to machines for closing, filling, and sealing pasteboard cartons which may contain various domestic products, such as soap flakes, cereal, or the like.

The invention provides a machine for gluing and sealing the bottom flaps of a carton, clamping the cartons to set the glue on the sealed flaps in preparation for filling, and subsequently closing and sealing the top flaps. In this sequence of operations, a novel coordination is effected between the units of the machine in which the upper flaps are pre-positioned upon entry into the machine, are maintained in such position during the bottom sealing operation, and when the carton is clamped, the top flaps are additionally set or creased. Thus, when the cartons are conveyed through filling and top sealing instrumentalities, the upper flaps are in prepared positions calculated to simplify such final operations and to simplify the mechanisms as a result thereof.

The invention is also directed to several mechanical units which are devised to fulfill their functions in a positive manner and with less complex means than have heretofore been used. In the entry portion of the present machine, for example, an auxiliary pallet conveyor receives the cartons and squares them while forwarding them through the bottom sealing operation. In the top sealing mechanism, the objectionable but heretofore necessary practice of inclining the glue rolls, is obviated by tipping the cartons by cam-like stationary means, while the cartons are in transit through the unit.

The present invention also provides a packaging machine which may be readily adjusted to accommodate boxes of different dimensions, thereby reducing the capital investment which otherwise would be necessary. Additional objects and advantages, and a practical embodiment of the invention, will be apparent from the following description, read in connection with the accompanying drawings, wherein:

Figure 10:
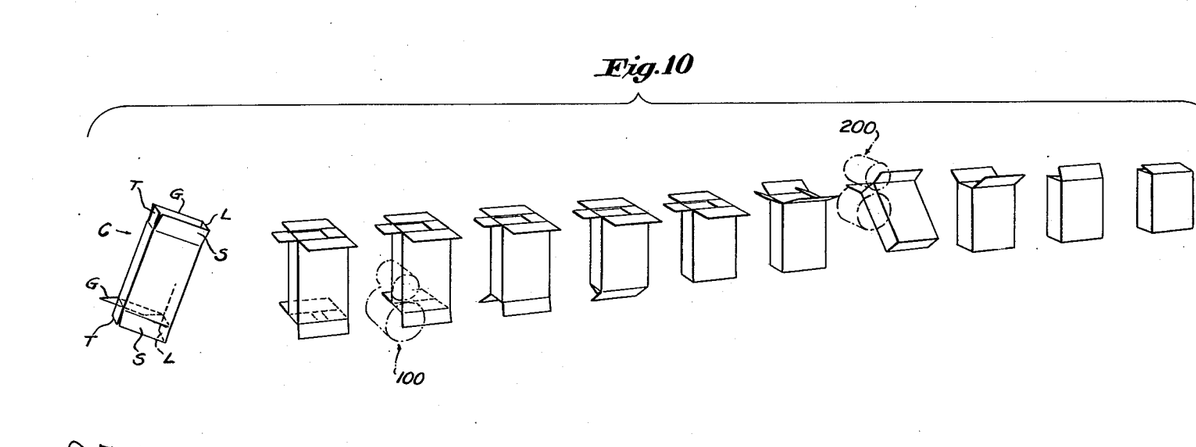
Fig. 10 is a perspective view showing diagrammatically the progressive operations performed on the cartons by the entire machine.

The machine is devised for operation with cartons C, which, as illustrated in Fig. 10, are first manually squared and are then inserted in the machine in the vertical position shown. For convenience of reference, the flaps projecting from the leading edges of the carton are termed leading flaps L; the opposite flaps, trailing flaps T; the side, glue-receiving flaps G; and the cover flaps S.

The machine generally consists of aligned units 20 and 21 (Figs. 1 and 11) which are organized to fold and seal the flaps on the bottom and top ends of the cartons respectively. The bottom sealing unit 20, which will be first described, is provided with an entrance fixture 22, which serves as a guide, and a bending instrumentality for the manual insertion of the cartons in the machine. In Fig. 10 it will be seen that the top flaps L and T are both initially bent rearward, while the bottom flaps L and T are bent inward or toward each other. This arrangement of flaps is maintained as the cartons pass through the unit 20 where the bottom flaps G and S are bent and sealed, and then the cartons are advanced into the unit 21 with the top flaps still retained in this predetermined and most advantageous position for the final filling and top sealing operations, as will presently be more specifically described.

Figure 1:
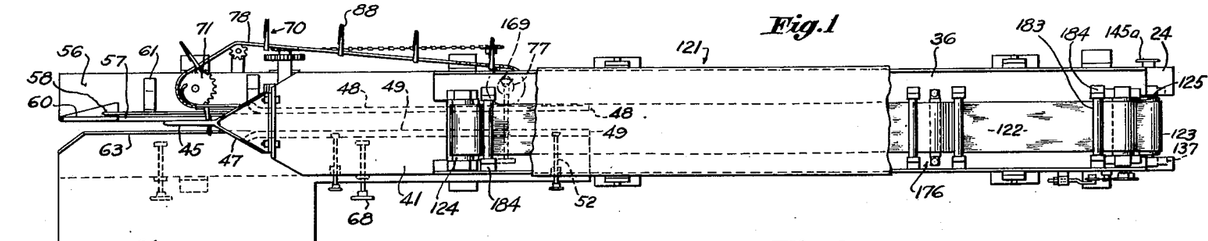
Fig. 1 is a top view of the bottom sealing unit.
Figures 3, 4:
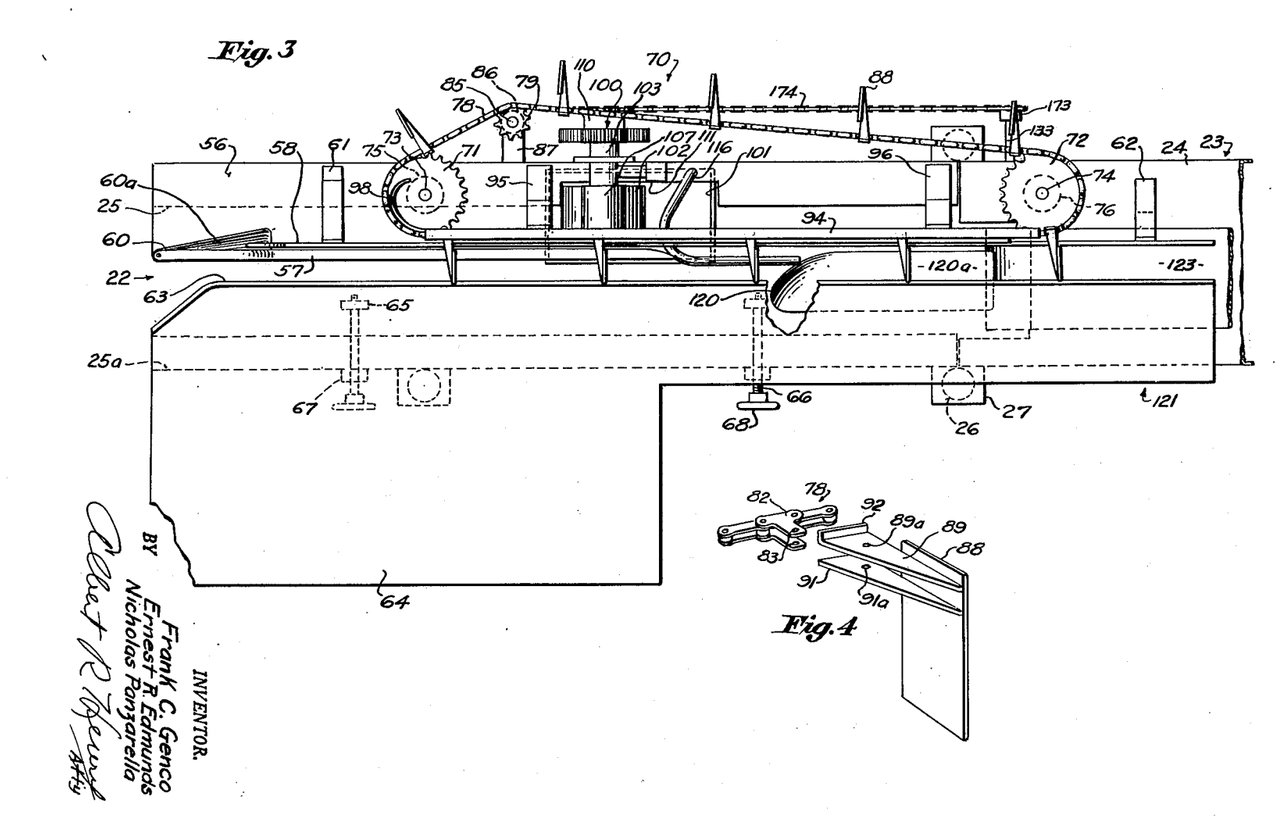
Fig. 3 is an enlarged top view of the entrance portion of the bottom sealing unit with the top conveyor deck removed.
Fig. 4 is a perspective view showing the pallet structure and associated section of conveyor chain.
Figure 5:
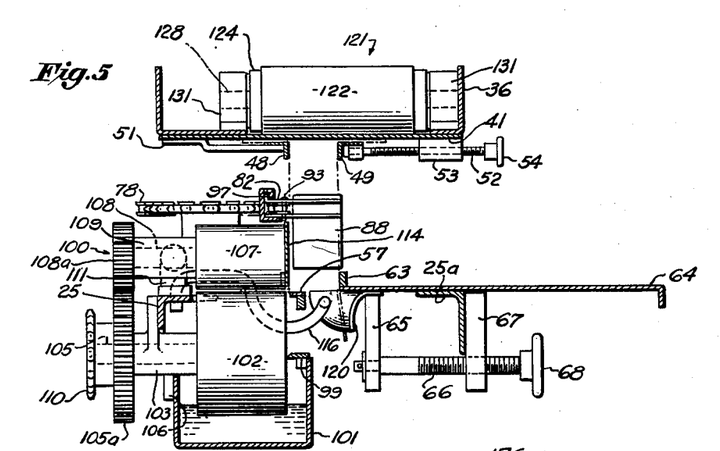
Fig. 5 is an enlarged cross section on the line 5—5 of Fig. 2.
Figures 8, 9:
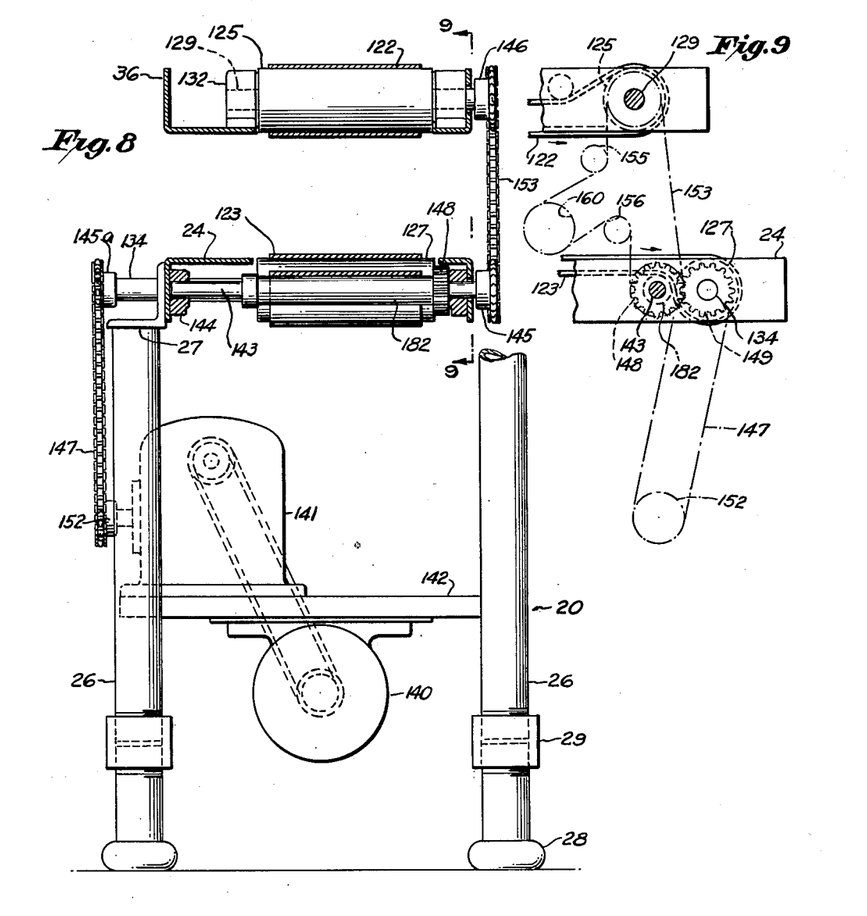
Fig. 8 is an enlarged cross section on the line 8—8 of Fig. 2.
Fig. 9 is a fragmentary section on the line 9—9 of Fig. 8.

The unit 20 consists of a base 23, fabricated from an inverted channel 24 and coextensive and parallel angles 25 and 25a (Figs. 1, 3 and 5). Three pairs of legs 26 support the base 23, and such legs are each provided with an angular cap member 27 which is welded to the sides of the channel 24 or angles 25, 25a. As best seen in Fig. 8, terminals 28 are connected to each leg 26 by large nuts 29, by which means the level of the base 23 may be precisely adjusted.

Frame members 31 of U-shaped configuration (Fig. 6) are mounted transversely beneath the channel 24, with their vertical legs 32 welded to the sides of the channel. The legs 32 are formed with spaced gibs 33 which receive slidably the vertical legs 34 of the yoke 35. The upper ends of the yoke legs 34 carry a top conveyor structure including an elongated channel 36. The yokes are formed with threaded central portions 37 for receiving screws 38 whose upper terminals 38a are rotatably mounted in the overlying frame members 31. A handwheel 39 carried by each screw 38 affords means for elevating each yoke 35, and thus adjustably positioning the channel 36 relative to the channel 24.

The channel 36 carries a plate 41 (Figs 1, 2, and 5) which projects to the left and is flanged at its extremity as indicated by the numeral 41a. A plough member 42 is provided with a similar flange 42a for connection with the flange 41a by bolts 44. The plough member has a narrow terminal portion 45 curving downward and merging with symmetrical wing portions 47. Side guide rails 48 and 49 are carried by the plate 41 in slightly spaced relation thereto, the rail 48 being supported rigidly by mounting members 51 (Fig. 5), and the rail 49 being adjustably carried by screws 52. The screws 52 are threaded in nuts 53, which are secured to the plate 41, and projecting portions of the screws are furnished with handwheels 54 to permit manual adjustment of the rail 49. It will be seen from Fig. 1 that the entrance ends of the guide rails are flared outwardly to facilitate the entrance of the cartons therebetween.

A plate 56 is secured to the top of the angle 25, and it serves as a support for an inclined horn 60, which, together with the overlying plough member 42, constitutes the previously mentioned entrance fixture 22. A bottom support rail 57 forms a continuation of the horn 60 (Fig. 3) and it extends into the machine horizontally. A side guide rail 58 is supported above the plate 56 by a mounting member 61, and it likewise projects horizontally and beyond the end of the rail 57, where its right hand extremity is secured to the channel 24 by a second mounting member 62. A second guide rail 63 (Figs. 3 and 5) forms part of an adjustable shelf structure 64. Depending lugs 65 are carried by the shelf 64, and they rotatably receive the shouldered ends of adjusting screws 66, which in turn are carried by stationary nuts 67 secured to the angle 25a. Handwheels 68 are secured to the screws 66, which may be manipulated to adjust the shelf 64, and thus the rail 63, laterally with respect to the stationary side rail 58 to accommodate cartons of different widths.

Figure 2:
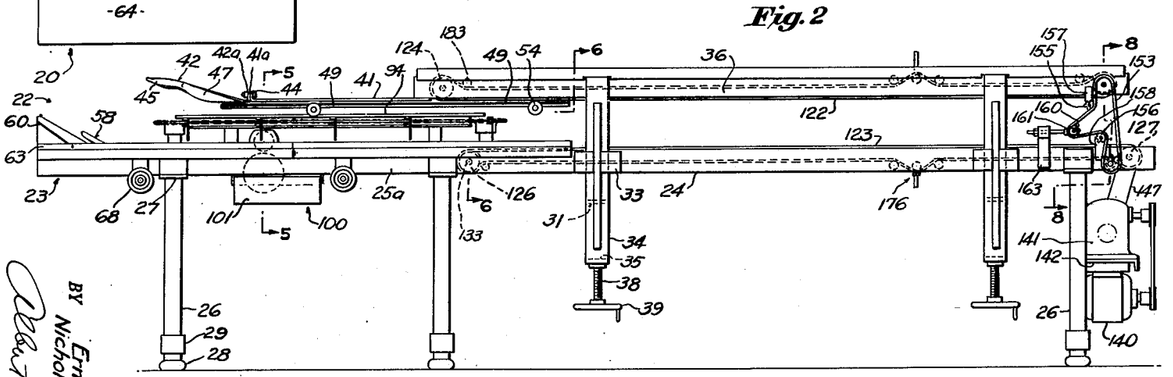
Fig. 2 is a side elevation thereof.

The horn 60 and plough 42, as best seen in Figs. 2 and 3, serve to aid the operator to insert the carton and to deflect and position the flaps in the desired predetermined position. After squaring the carton, the operator rolls the bottom of the carton on the horn 60, so that both lower flaps T and L are bent inward (Fig. 10). The carton is immediately thereafter pushed directly down the inclined horn 60 to bring the lower glue flap G into the sloping plough surface 60a of the horn, causing such flap to be pivoted to a horizontal position on the plate 56 and under the stationary side guide rail 58. A continuation of this movement brings the carton under the plough 42, whereupon the upper flaps L and T successively engage the terminal 45, causing these flaps to be bent rearward. The upper flaps G and C are bent outwardly upon contacting the wing portions 47, so that they ultimately ride against the overlying flat surface of the upper plate 41, and above the horizontal flanges of the rails 48 and 49. The lower margins of the carton now engage the support rail 57 which serves as a horizontal guide during the automatic gluing operation, which will now be described.

A pallet or auxiliary conveyor 70 is located adjacent the described entrance fixture 22, and it comprises spaced sprockets 71, 72 (Fig. 3) having attached shafts 73 and 74 carried by vertical bearings 75 and 76 respectively. The bearing 75 is welded to the plate 56, while the bearing 76 is similarly secured to the top of the channel 24. The shaft 74 extends downward through a suitable opening in the channel 24 (Fig. 6) where it receives a bevel gear 77 which serves as a driven connection with the remaining motive elements of the unit 20, as will be later described. An endless chain 78 engages about the sprockets 71, 72 and a laterally offset idler sprocket 79 (Figs. 1 and 3). The chain, at spaced intervals, is provided with special projecting links 82 (Fig. 4) having aligned apertures 83. The idler sprocket 79 is mounted on a shaft 85 which is carried in a vertical bearing 86, the lower end of which is secured to a bracket 87 extending to and welded to the angle 25.

The pallets 88 are of rectilinear formation (Fig. 4) having integral parallel arms 89 and 91, projecting beyond the margin of the pallet, which are formed with vertically aligned apertures 89a and 91a. The upper arm 89 is additionally provided with an upstanding flange 92. The pallets 88 are each mounted on a link 82 of the chain 78 by a pivot pin 93 which extends through the various apertures of the link and pallet.

The front leg of the chain 78 is received in a track 94 which is rigidly mounted on brackets 95 and 96 secured to the plate 56 and channel 24 respectively. The track 94 is channel-shaped in cross section (Figs. 5 and 6), with its upper leg having a reentrant vertical flange 97, within which structure the vertical flanges 92 of the pallets 88 are slidably received. Thus, as the pallets enter the track 94, they are retained in vertical planes normal to the track, while after leaving the track they are free to pivot on their pin connection with the chain 78. The left hand or entrance end of the track 94 is provided with a spiral extension 98 (Fig. 3) overlying the sprocket 71 and serving to guide the flange portions 92 of the pallets into proper position for entry into the track 94.

The pallet conveyor 70 is driven counter-clockwise as viewed in Fig. 3, with the pallets on the track section 94 moving from left to right. The operator times the insertion of the cartons in the entrance fixture 22 and within the horizontal stretches of the guide rail structures, so that the cartons are successively engaged by the pallets. Now under fully automatic control, the lower flaps are then glued and sealed.

A glue applicator unit 100 is devised to apply glue to both surfaces of the lower flap G, and it includes a glue tank 101 located beneath the angle 25, and having partially immersed therein a large applicator roll 102 (Figs. 3 and 5). A bearing bracket 103 is secured to the angle 25, and it rotatably receives a shaft 105 which carries the roll 102. A depending flange portion 106 of the bracket 103 serves to carry the tank 101, which is welded thereto. The tank is furnished with a scraper or doctor blade 99 for the roll 102. An upper applicator roll 107 is provided with a shaft 108 which is rotatably received in a bearing member 109. The bearing member is provided with a bracket portion 111 which is secured to the top of the angle 25. A shield 114 is secured to the tank and the side guide rail 57 (Fig. 5) to cover the end of the upper roll 107, and it protects the bodies of the passing carton from contact with the roll while the flaps G are engaged between the rolls. The shafts 105 and 108 carry meshing gears 105a, 108a, and the shaft 105 additionally carries a sprocket 110 which is driven by means hereinafter described.

As each carton passes beyond the glue applicator unit 100, the glue treated flap G thereof engages a plough bar 116 (Figs. 3 and 5) which is disposed in the path of the flap G, and which is secured to the top of the channel 24. The plough bar 116 is suitably curved so that the engaging flap G is deflected from its initial horizontal position through 180° of movement to a closed position covering the leading and trailing flaps L and T (Fig. 10). A closing plough 120, in the form of a sheet metal horn, is secured beneath the adjustable shelf 64, and it is disposed in the path of the depending closure flaps S. As best shown in Figs. 3 and 10, it will be seen that the flaps S initially engage the plough 120 during the final closing movement of the glue flaps G, and, as a particular carton is moved by its platen along the guide rails, the flap S is moved to a position covering the flap G. The closing plough 120 merges into a horizontal portion 120a at its right hand end, and such portion serves to support the carton during the remaining short length of travel toward the glue setting or clamping unit 121 of the machine.

The clamping unit 121 consists of belts 122 and 123 disposed about rollers 124, 125 and 126, 127 respectively, with the lower belt 123 riding on the flat surface of the channel 24 and the belt 122 being guided by the overlying surface of the channel 36. The upper rolls 124, 125 have pintles 128, 129 mounted in bearings 131, 132 which are secured to the upper channel 36. The lower rolls 126, 127 have pintles 133, 134 mounted in bearings 135, 137, which bearings are secured to the lower channel 24. The belts are driven through a motor-reducer set 140, 141 suitably mounted on a bracket 142 carried by the legs 26 at the right hand end of the unit (Figs. 2 and 8). One end of the pintle 134 is furnished with a sprocket 145a which is directly connected to a driven sprocket 152 of the reducer 141 by a chain 147.

A cross shaft 143 is carried in bearings 144 (Fig. 8) which are secured to the channel 24 adjacent the lower roll 127. Gears 148, 149 (Fig. 9) carried by the shaft 143 and roll pintle 134 respectively, provide a driving connection for the shaft 143. The shaft 143 is also furnished with a sprocket 145 which is operatively connected by a chain 153 to a sprocket 146 secured to the pintle 129 of the overlying roll 125. For purposes of adjustment, the chain 153 is additionally carried over idler sprockets 155, 156, and 160, the sprockets 155 and 156 being suitably mounted on brackets 157, 158 on the upper and lower channels 36, 24 respectively. The sprocket 160 (Figs. 2, 8, and 9) is carried by a bearing 161 which is mounted for horizontal adjustment in a bracket 163 on the channel 24.

Figure 6:
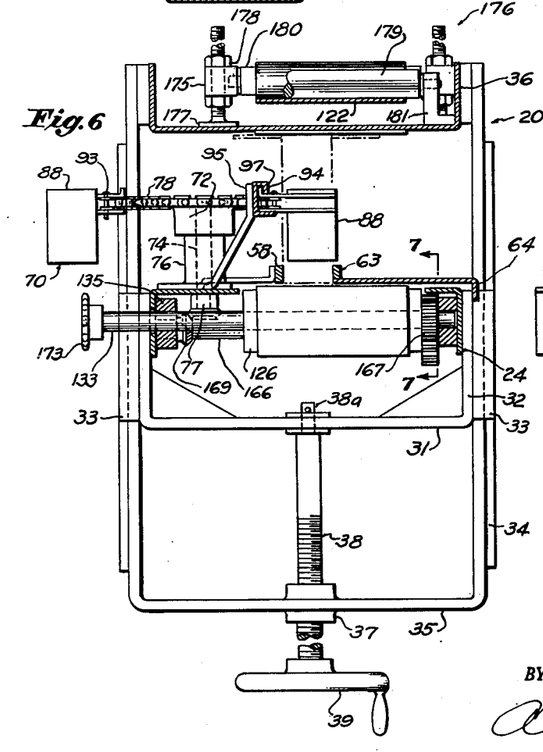
Fig. 6 is an enlarged cross section on the line 6—6 of Fig. 2.
Figure 7:
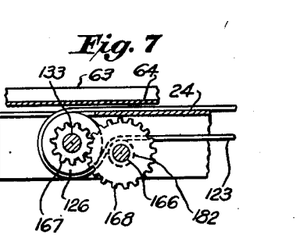
Fig. 7 is a fragmentary section on the line 7—7 of Fig. 6.

A second cross shaft 166 is located adjacent the remaining lower roll 126 and it is connected to the pintle 133 of the lower roll 126 by gears 167, 168 (Figs. 6 and 7). Thus, the roll 126, driven by the belt 123, in turn drives the shaft 166. The shaft 166 carries a bevel gear 169, meshing with the previously described gear 77, the latter being secured to the previously mentioned shaft 76, which drives the pallet conveyor 70. The pintle 133 of the lower roll 126 projects to the rear of the machine, where it receives a sprocket 173 which is connected to the sprocket 110 of the glue applicator unit 100 by a chain 174.

The belts 122, 123 are retained in a taut condition by adjustment devices 176 (Figs. 1, 2, and 6) consisting of threaded spaced standards 177 welded to the channels 36 and 24 and each having bearing blocks 175 slidably received thereon, and which blocks are adjustable by means of lock nuts 178. Rolls 180 are mounted between the blocks 175, which receive the pintles of the rolls. Idler rolls 179 are disposed on both sides of each roll 180, and they are mounted in bearings 181. Additional idler rolls 182 are located near the extremities of the belts, the lower belt 123 having such rolls disposed for free rotation on the cross shafts 143, 166. Similar idler rolls 183 for the upper belt 122 are mounted between bearing pairs 184 secured to the upper channel 36.

It will be observed that after the cartons are bottom sealed, as previously described, they rest on the flat portion 120a of the plough 120, and are slid to the right, where they first engage under the overhanging belt 122 and immediately thereafter pass from the portion 120a onto the lower belt 123. During this transition, the pallets 88 leave the track 94, and the cartons are henceforth moved to the right by the belts alone, between which they are retained under slight pressure for the duration of the run, which is sufficient to set the glue on the bottom flaps and also to crease the bent upper flaps in preparation for the succeeding filling and top gluing operations. The spacing of the belts is preferably slightly out of parallel (through the adjustments 39) so that as the cartons are moved to the right, increasing pressure is gradually applied.

The top sealing unit 21 (Figs. 11 to 16 inclusive) includes a base similar to that of the unit 20, having an inverted channel 191 similarly supported on legs 26. A fabric belt 192 is disposed about rolls 193, 194 mounted at opposite extremities of the channel 191 by means of bearings 189 which receive the pintles thereof. The top stretch 192a of the belt 192 rides along the web of the channel 191 and it is aligned with the belt 123 of the unit 20, so that the cartons are passed onto the belt 192 for succeeding operations. The belt 192 is driven at a similar rate of speed as the belts 122, 123 of the unit 20 by a second motor-reducer set 140, 141, and through a sprocket arrangement which may be identical to that of the unit 20, and therefore designated on Figs. 11 and 12 by the same numerals. From an operational viewpoint, the belts 192 and 123 may be considered as a unitary conveyor means for advancing the cartons C.

Figures 11, 12:
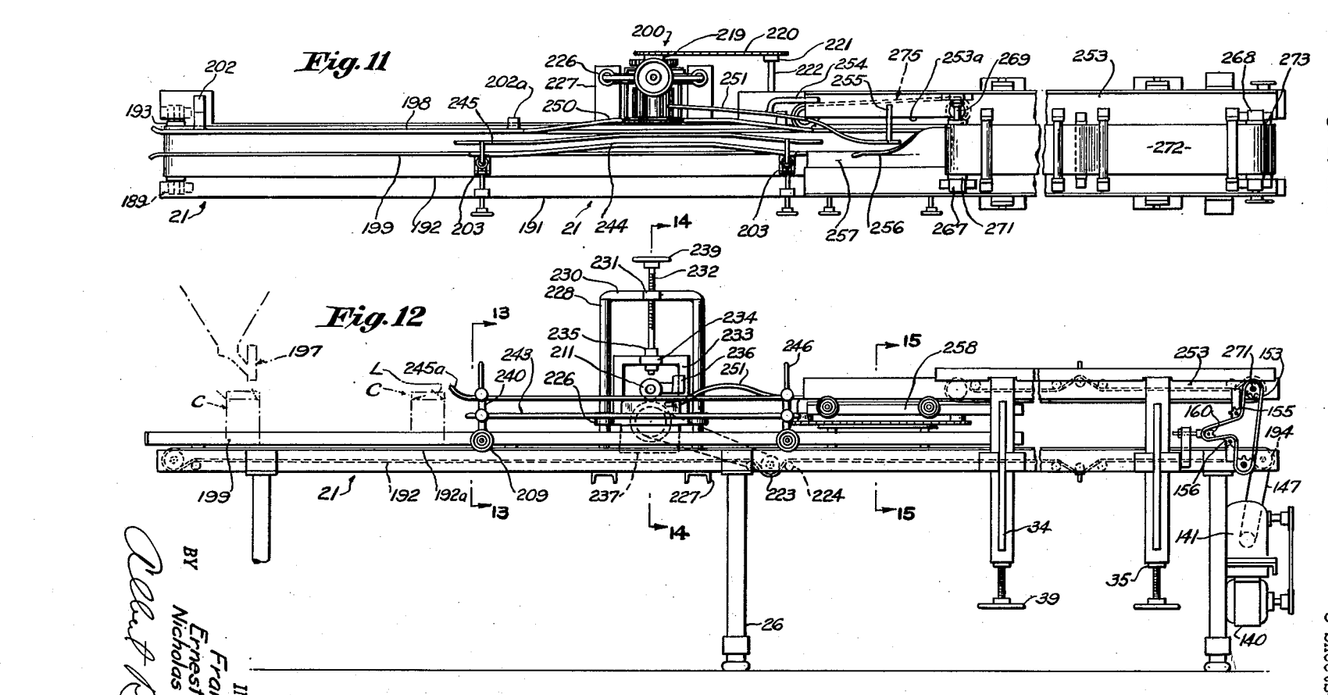
Figs. 11 and 12 are top and side views respectively of the top sealing unit.

As the cartons are moved with the belt 192, they initially pass a filling station 197 indicated in dot and dash lines on Fig. 12, where they receive a measured quantity of granular material. The station 197, which in detail is not intended to form a part of the invention, may be of any known type, either manual or automatic, which may deliver material into each carton through the previously prepared open top flaps, under supervision of an operator who, at the completion of the operation, closes the trailing flap T.

After the filling operation, the cartons advance toward a second glue applicator unit 200. Inasmuch as the flaps L and T may have a tendency to raise up, provision is made for holding them down and creasing them before the upper flap G is coated. This is effected by means of a horizontal rod 245, mounted above the belt section 192a in a manner hereinafter described, whose forward or left hand end is turned up to form a plough 245a. As the cartons C engage the plough 245a, the flaps L and T are depressed, and are thereafter held in closed position by the rod 245.

Figure 13:
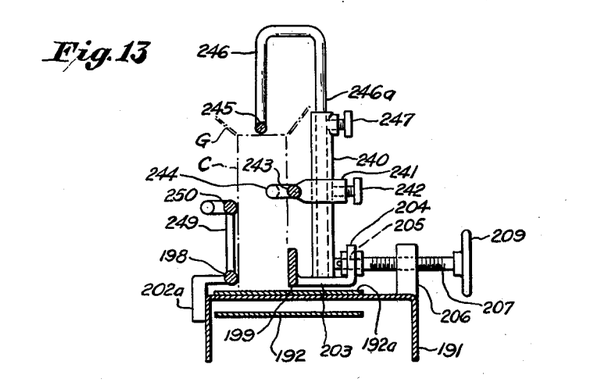
Fig. 13 is an enlarged section on the line 13—13 of Fig. 12.

Side guide rails 198, 199 prevent lateral displacement of the cartons on the entrant portions of the unit 21 and beneath the filling station 197 to the glue applicator unit 200 (Figs. 11 and 12). The rail 198 is mounted in a fixed position by brackets 202, 202a welded to the channel 191 (Fig. 13). The rail 199 is mounted for lateral adjustment to accommodate cartons of differing widths by means of bracket members 203 secured thereto and each having a vertical leg 204 formed with a horizontal bearing 205. Nuts 206 welded to the channel 191 carry adjusting screws 207, rotatably received in the bearings 205. The screws 207 are provided with handwheels 209.

The glue applicator unit 200 (Figs. 11, 12, and 14) differs from the previously described glue applicator unit 100 in that it is bodily vertically adjustable so that it may be accommodated to cartons of differing heights. The unit 200 consists of small and large rolls 211, 212 having shafts 213, 214 projecting through bearings 215, 216 and supplied with meshing gears 217, 218. The lower shaft 214 additionally carries a sprocket 219 which is connected by a chain 220 to a drive sprocket 221. A cross shaft 222, journalled beneath the channel 191 in a bearing 222a, carries the sprocket 221 and a roll 223 (Figs. 11 and 12). The belt 192 is maintained in intimate arcuate contact with the roll 223 by a pair of idler rolls 224. Thus, the belt 192 serves as a drive for the roll 223, which in turn drives the glue applicator rolls 211, 212.

The lower bearing 216 of the unit 200 is formed with oppositely projecting bearing portions 226. Transverse channels 227 welded beneath the channel 191 carry vertical posts 228 which serve to receive the bearing portions 226 for adjusting movement. The upper extremities of the posts 228 are connected by a rail 230 having an enlarged central tapped portion 231 for receiving a vertical adjusting screw 232. An arch member 233 is welded to the portions 226 of the bearing 216, and it extends upward, where its horizontal portion is formed with a vertical bearing 234 for rotatably receiving the lower terminal of the screw 232. Lock collars 235 are secured to the screw 232 to position the terminal thereof in the bearing 234. The upper roll bearing 215 is provided with an extending portion 236 which is secured to the side of the arch member 233.

A glue tank 237 is secured beneath the portions 226, and it encloses the lower portion of the roll 212. The front of the tank 237 is provided with a vertical extension 238 which serves as a shield and support for the passing cartons, as will presently be described. The screw 232, by means of a handwheel 239 secured thereto, may be manipulated to raise or lower the described bearing structure and the accompanying rolls 211, 212 and tank 237 to accommodate cartons of various heights.

As the cartons are moved successively past the glue applicator unit 200, they are gently tipped to an inclined position (Fig. 14); maintained in such position while the flap G passes between the glue rolls 211, 212; and they are restored to the original vertical position for the subsequent and final operations. The means for accomplishing this includes a stationary guide structure including hollow vertical standards 240 secured to the members 203. Collars 241 (Fig. 13) are received on the standards 240 and secured thereto by set screws 242. A guide rod 243 connects the collars 241, being welded thereto, and having its intermediate portion bent inward to form a cam or carton tipping section 244 (Fig. 11). The top guide rod 245 is likewise carried by the standards 240, having arch-like supporting members 246 (Fig. 13) secured thereto, whose vertical terminals 246a are received within the standards 240 and secured by set screws 247.

Figure 14:
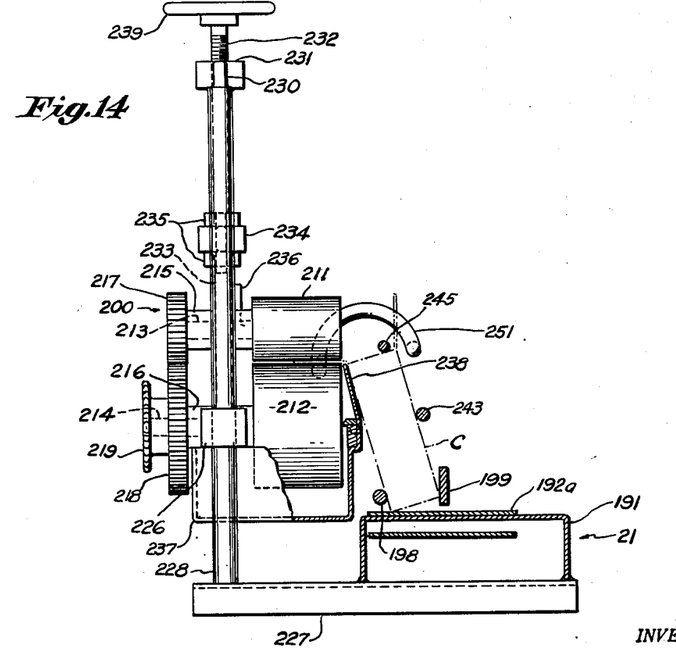
Fig. 14 is an enlarged section on the line 14—14 of Fig. 12.

The cam section 244 of the rod 243 engages the outer side of the cartons and tips them rearward as viewed from the front of the machine, or to the left as viewed in Fig. 14. It will be seen that the inner stationary guide rail 198 acts as a pivot for the carton during this action, while the shield 238 of tank 237 provides a back support. The rail 198 is supplied with welded vertical extensions 249 which carry bent horizontal back support bars 250 to supplement the supporting action of the shield 238. While the carton is in the tilted position, the flap G passes between the rolls 211 and 212 to receive a coating of glue on each side. The carton is then restored to the vertical position by the rods 198, 243, and 245, whose right hand portions are bent back into alignment with the inlet ends, as will be readily apparent from Fig. 11. During this action, the glued flap G engages a plough 251, bent upwardly and inwardly as shown in Figs. 11 and 12, which folds the flap over 180° into engagement with the flaps L and T.

An upper channel 253 is adjustably supported by yokes 35, and the left hand end thereof is notched as indicated by the numeral 253a to provide an opening into which the rod 251 extends. Brackets 254, 255, secured to the channel 253, support the rod 251. A plough 256 (Fig. 15), formed of sheet metal, is mounted on the channel 253 adjacent the terminal of the rod 251, and it is formed to be engaged by the cover flap S, which is progressively bent downward to cover the flap G. The mounting for the plough 256 consists of a plate 257 located beneath the channel 253, to which plate the plough is welded. The plate 257 additionally carries a side guide member 258 and bearing members 259. Nuts 261 welded to the channel 253 receive adjusting screws 262 whose terminals are entered in bearing members 259, whereby the screws carry the structure 256, for lateral adjustment. A fixed guide bar 260 is secured to the channel 253 by brackets 264.

The upper channel 253 has secured to its bearing pairs 267 and 268 for receiving pintles 269 and 270, which carry rolls 271 and 273 respectively. A clamping belt 272 is disposed about the rolls 271, 273, and the latter roll is driven by a chain connection, including sprocket and idler elements, identical to that of the unit 20, and which therefore need not be described in detail.

A frictional drive means or booster 275 (Figs. 15 and 16) to prevent slipping of the cartons on the belt 192, is supplied at the closing plough locations of the mechanism, and it consists of a chain 276 disposed about sprockets 277, 278.

These sprockets are attached to vertical shafts 279, 280 which are mounted in bearings 282, and such bearings are secured to the under side of the channel 253. The shaft 280 projects upward through its bearing, and it receives a bevel gear 284. A meshing bevel gear 285 on the shaft 269 of roll 271 (Fig. 15) serves to drive the booster 275, with the chain 276 thereof being operated at the same rate of speed as that of the belts 192 and 272.

The chain 276 is supplied with spaced special links 276a, which are adapted to engage the rear corners of the cartons. The chain 276 is urged into light lateral contact with the cartons by resilient means including a shoe 286 (Fig. 15) carried by a pair of leaf springs 287, which in turn are each secured to a bracket 288. The brackets 288 are slotted, as indicated by the numeral 289, to receive bolts 291 carried by the underlying channel 191 to permit lateral adjustment of the shoe 286 and the degree of pressure applied to the chain 276.

Figure 15:
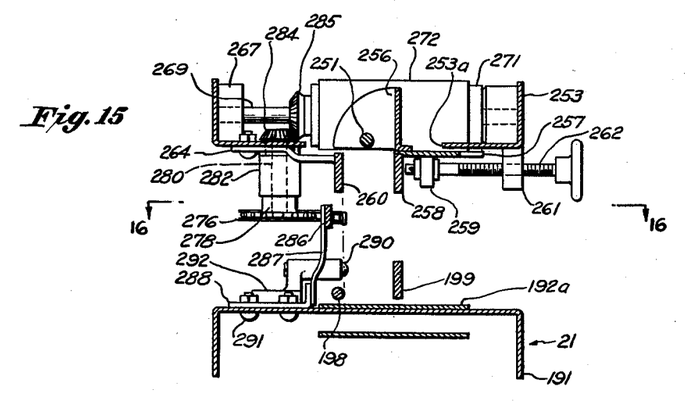
Fig. 15 is an enlarged section on the line 15—15 of Fig. 12.
Figure 16:
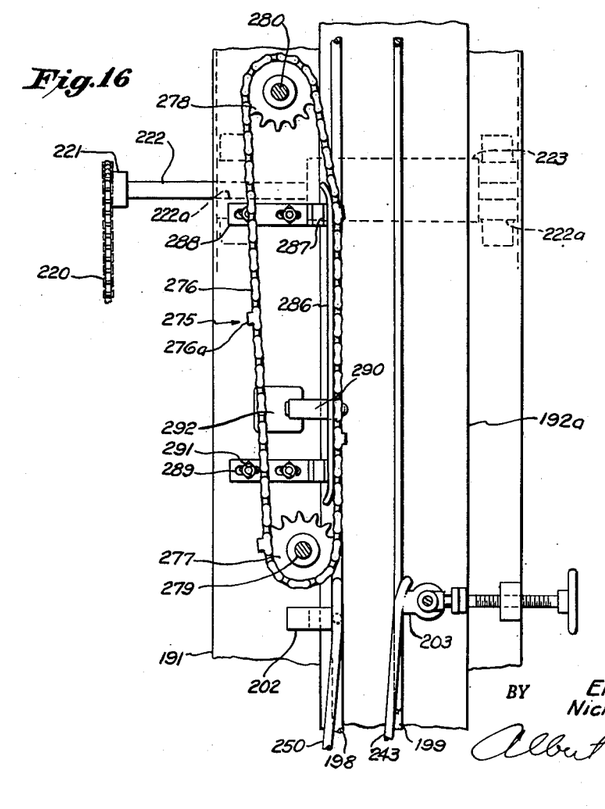
Fig. 16 is an enlarged fragmentary top view showing the chain conveyor in detail.

A spring-pressed detent 290 is mounted on a bracket 292 secured to the channel 191 (Figs. 15 and 16). The detent is disposed in the path of the cartons on the entrant portions of the booster 275, and it affords a delaying means for momentarily stopping the cartons until the links 276a register with and drive the cartons past the detent and thence through the zone of the plough 256 in a positive manner.

It will be seen that the clamping belt 272 is located immediately adjacent the effective terminus of the chain 276, so that after the last flaps of the carton are folded, the carton is engaged between the belts 192 and 276, and conveyed to the right for delivery out of the machine.

Referring to Fig.10, it will be noted that the original semi-manual positioning of the upper flaps of the carton in the entrance fixture 22 is retained through the unit 20. The pressure applied therein to the upper flaps positions and retains them in a definitely set relationship, while the lower flaps are being glued and moved into sealed position. As the carton is delivered on the belt 192 of unit 21, the upper flaps spring back slightly from their former restrained horizontal positions to angular positions, which advantageously facilitate filling at station 197. Later, after the filling operation, the flap L, being in an angular position, is closed by simple engagement with the stationary rod end 245a.

The vertical adjustment of the upper decks of the units 20 and 21 provides not only for a various range of carton heights, but also an adjustment whereby the clamping belts may be set to converge or diverge very slightly out of parallelism with the underlying conveyor belts. This permits a graduation of pressure application to the sealed flaps which is occasionally found necessary with cardboard of differing grades in order to obtain proper sealing.

It is believed that the machine and its mode of operation has been so fully explained above that a detailed review is unnecessary. It will be recalled that the empty carton, formed with flaps on each end and along each edge, is placed in the machine by simply opening it up or squaring it, with the flaps turned outwardly in predetermined directions. One end of the carton is placed on the horn 60, whose configuration is such as to flip the lower glue flap G under the guide rail 58, where it is retained for subsequent passage through the glue rolls 102 and 107. The upper plough 42 insures the opening of the top flaps G and S, while the support and guide rails 57, 48, 49, and 63 retain the carton in proper position, and prevent lateral displacement.

The pre-positioned cartons are then conveyed by the pallet conveyor 70 in uniformly spaced relation, and at a synchronous speed, past the glue rolls 102 and 107, where the lower flap G receives an adhesive coating on both sides. The lower flaps G and S then successively strike the ploughs 116 and 120, which fold them, first one and then the other, over the short flaps L and T, thereby closing the end of the box. The cartons are then delivered to the spaced conveyor belts 122 and 123, which transport them to the discharge end of the unit 20, and also apply enough pressure to set the glue and thereby seal the lower end of the box.

The mechanism for closing the top end of the box will be recognized as having many analogus features. The entrance plough 245a and guide rail 245 retain the flaps L and T in closed position, while the guide rails 198, 199, prevent lateral displacement of the carton on the conveyor belt 192. The side guide rail 243, formed with the cam section 244, in cooperation with the lower guide rails, causes the carton to tilt as it approaches the second glue applicator 200, where the upper flap G is coated on each side. Thereafter the ploughs 251 and 256 successively close the glued and unglued top flaps, to seal the upper end of the box.

It will be noted that a positive feed side conveyor, such as the pallet conveyor 70, is not provided at the inlet end of the glue applicator 200, but that a booster conveyor 275 is provided at the inlet end of the second sealing conveyor, and it thus partakes of some of the features of the conveyor 70. It will also be observed that both bottom and top gluing units are disposed at one side of the linear path of the cartons through the machine, which is highly advantageous as the conveyors cannot be soiled by dripping glue, as is the situation with certain prior machines. The location of the second applicator 200 at one side of the conveyor 192, in conjunction with the slight tilting of the carton, insures an ample coverage of the flap G with adhesive, without staining the exterior of the carton or spilling its contents.

It will also be observed that the cartons pass through the unit 20 without being fitted over filler blocks, which are unnecessary in the present machine. The omission of such blocks, which are considered as essential in certain packaging machines, represents another important advantage. Provision has been made for adjustment for both height and width by moving the upper sealing conveyor belts and the guides on one side of the machine, this enabling the user to operate with a number of different size cartons.

While the invention has been described with respect to one practical embodiment thereof, it will be apparent that it is subject to numerous modifications and alterations without departure from its principles. Accordingly, it is intended that the invention should be accorded a scope commensurate with that expressed in the following claim.

We claim:

In a machine for closing and sealing end flaps of a carton, and wherein the carton is progressively moved through the machine in a substantially straight line of travel, a supporting platform upon which the carton is placed in substantially upright position, an entrance plough above the platform for moving at least certain of the flaps into a predetermined position and with flaps on opposite sides of the carton disposed outwardly and transversely to the line of travel, spaced guide rails for engaging opposite sides of the carton to forestall lateral movement thereof, a glue applicator comprising a pot and pairs of rolls disposed to one side of the line of travel, said rolls being substantially horizontal, conveyor means for advancing the carton over the supporting platform and to the glue rolls, the rolls being so positioned with respect to the line of travel as to coat one of said outwardly and transversely disposed flaps, a closure plough positioned over the line of travel and adapted to be engaged by the coated flap to bend said flap on top of the carton, a second closure plough positioned over the line of travel and spaced from the first closure plough to bend the other transversely disposed flap over on the glued flap, a pair of horizontally disposed and vertically spaced conveyor belts adapted to receive the carton, apply pressure to the end thereof, and move the carton along the line of travel to seal the closed flaps, further conveyor means to feed the cartons from the glue rolls to the spaced belts, vertically adjustable supports for one of the spaced conveyor belts, means for adjustably positioning the guide rails toward and away from each other, and drive means for positively driving the conveyor means and belts at synchronous speeds.

FRANK C. GENCO.
ERNEST R. EDMUNDS.
NICHOLAS PANZARELLA.

References Cited in the file of this patent

UNITED STATES PATENTS

| Number | Name | Date |
|---|---|---|
| 1,161,581 | Anderson | Nov. 23, 1915 |
| 1,165,695 | Montgomery et al. | Dec. 28, 1915 |
| 1,312,640 | Mallinckrodt | Aug. 12, 1919 |
| 1,791,104 | Muskot | Feb. 3, 1931 |
| 2,109,537 | Kimball | Mar. 1, 1938 |
| 2,136,901 | Ferguson | Nov. 15, 1938 |
| 2,266,054 | Lowey et al. | Dec. 16, 1941 |
| 2,425,067 | Lowey et al. | Aug. 5, 1947 |

FOREIGN PATENTS

| Number | Country | Date |
|---|---|---|
| 294,332 | Great Britain | July 26, 1928 |